L. L. TREMAN.
Meat-Tenderer.
No. 203,218.　　　　Patented April 30, 1878.
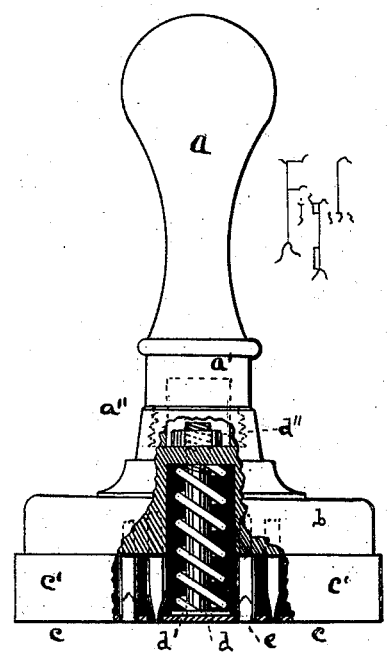
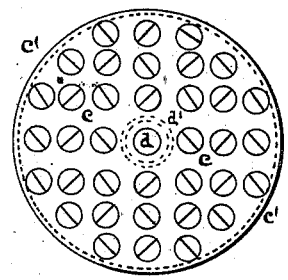

UNITED STATES PATENT OFFICE.

LAFAYETTE L. TREMAN, OF ITHACA, NEW YORK.

IMPROVEMENT IN MEAT-TENDERERS.

Specification forming part of Letters Patent No. 203,218, dated April 30, 1878; application filed February 5, 1878.

*To all whom it may concern:*

Be it known that I, LAFAYETTE L. TREMAN, of Ithaca, Tompkins county, New York, have invented an Improved Meat-Tendering Tool or Implement, whereof the following is a description, reference being had to the accompanying drawings.

My object is to make a hand-tool compact in form and size, and capable of puncturing, cutting, and making tender meat; and my invention has reference to the means used in the structure of my meat-tendering implement, as will be apparent as I describe it.

Figure 1 is an elevation, partly sectional, of my tool. Fig. 2 is a view of the base of the same.

In the figures, $a$ is the handle of the tool or meat-tendering implement; and $b$ is the zinc metallic tooth-holder, just below the vertical handle; and $c$ is the meat-stripping plate, the object of which is to push the meat off of the teeth at each blow of the implement as the meat is punctured, for in the use of meat-tendering implements experience has amply shown that the meat adheres to the teeth, and that the operator of hand implements is obliged to expose his hands or fingers in dangerous proximity to the teeth when the blow is struck and the meat punctured, or that cumbersome apparatus is used to free the teeth out of the meat.

Now, I attach the plate $c$ to my implement, and, by a spring, make it operate about the teeth. This plate may be considered as made of two parts—first, the plate or base $c$; second, the circular or upright part or shield $c$. It is fast at its middle to a rod or stem, $d$, about which is the spring $d'$, bearing against the tooth-holder $b$ as a base, with the lower end of the spring acting on the plate $c$, and thus the force of the spring is expended in thrusting at all times this plate downward until checked by the nut $d''$ on the top of the stem $d$, and in keeping the meat off of the teeth $e$, except when the meat is being cut, when the spring is condensed, and allows the plate $c$ to slide up the teeth. The expansion, which is immediate, thrusts the meat off of the teeth, the spring or springs in their capacity being graduated to this end. This leaves the meat, usually steak, lying undisturbed and flat on the cutting-block, as by repeated blows it is punctured without exposure of the fingers or hand of the operator. This action is clearly seen in Fig. 1, which has parts cut away to allow the internal structure to be seen.

Fig. 2 is the bottom or base of my tool, and shows the ends of the teeth in the circular-plate apertures. The whole tool is made preferably circular in form, but may be made of other shapes. The plate-shield $c'$ is shown as part of the plate $c$, and in Fig. 1 to extend upward about the teeth, and it slides up about the tooth-block $b$ when the cutting is being done, as is indicated in the drawing.

The exact mode of arranging the spring $d'$ and central stem $d$ and checking-nut $d''$ allows of some variation, as two or three stems, springs, and nuts may be used to hold the plate $c$ to the tooth-block $b$; but a plate, $c$, held to the tooth-block $b$ and operating by automatic spring action, and as a part of a hand-tool used on a common market-stall block, is what I would have noticed, and connected therewith, and as a part of it, the second part of that plate or shield part that extends up about the sides of the teeth, as is shown, keeping out dirt and particles of meat, fat, and the like.

The further advantages and uses of my invention are apparent to those skilled in the art to which it appertains.

I claim—

1. In an improved meat-tendering tool, the plate $c$ about the teeth $e$, and held to the block $b$ by the rod $d$, and thrust downward to the ends of the teeth by the spring $d'$ about the rod $d$, and operating in relation to the block $b$, teeth $e$, and meat when punctured, substantially as and for the purpose set forth.

2. The shield $c'$, fast to the plate $c$, and thereby connected to and operating with the rod $d$, block $b$, and teeth $e$, substantially as and for the purposes set forth.

LAFAYETTE L. TREMAN.

Witnesses:
S. J. PARKER,
E. M. TREMAN.